United States Patent
Bird et al.

(10) Patent No.: US 8,782,714 B2
(45) Date of Patent: *Jul. 15, 2014

(54) ENTERTAINMENT SYSTEM WITH NETWORK OF DOCKING STATIONS

(71) Applicant: Systems and Software Enterprises, LLC, Brea, CA (US)

(72) Inventors: Randall Bird, Newport Beach, CA (US); Kevin Cote, Yorba Linda, CA (US); Rodney Farley, Yorba Linda, CA (US); Joseph Renton, Yorba Linda, CA (US)

(73) Assignee: Systems and Software Enterprises, LLC, Brea, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/936,973

(22) Filed: Jul. 8, 2013

(65) Prior Publication Data

US 2013/0318272 A1 Nov. 28, 2013

Related U.S. Application Data

(63) Continuation of application No. 12/610,908, filed on Nov. 2, 2009, now Pat. No. 8,484,686.

(60) Provisional application No. 61/119,132, filed on Dec. 2, 2008.

(51) Int. Cl.
| | |
|---|---|
| *H04N 7/18* | (2006.01) |
| *G06F 13/40* | (2006.01) |
| *H04L 29/06* | (2006.01) |
| *H04H 20/62* | (2008.01) |
| *B60R 11/02* | (2006.01) |
| *B60R 11/00* | (2006.01) |

(52) U.S. Cl.
CPC ......... *H04L 65/60* (2013.01); *B60R 2011/0294* (2013.01); *B60R 2011/0078* (2013.01); *G06F 13/4081* (2013.01); *B60R 2011/0096* (2013.01); *B60R 2011/0003* (2013.01); *H04H 20/62* (2013.01)
USPC .............................................. 725/75; 725/77

(58) Field of Classification Search
CPC ......... H04N 7/18; H04N 7/106; H04N 7/108; H04N 21/2146; H04N 21/43615
USPC ..................................................... 725/76–80
See application file for complete search history.

(56) References Cited

U.S. PATENT DOCUMENTS

| | | | |
|---|---|---|---|
| 6,608,399 B2 * | 8/2003 | McConnell et al. ......... 307/10.1 |
| 6,748,597 B1 | 6/2004 | Frisco et al. | |

(Continued)

FOREIGN PATENT DOCUMENTS

| | | |
|---|---|---|
| EP | 0634865 | 7/1994 |
| GB | 2466444 | 6/2010 |

(Continued)

*Primary Examiner* — Jason J Chung
*Assistant Examiner* — Sumaiya A Chowdhury

(57) ABSTRACT

An entertainment system comprising a media server networked with a plurality of docking stations is presented. The media server and docking stations can be networked together into a looped daisy-chained network to provide for content distribution to docked media players. The looped daisy-chained network retains connectivity or continuity when media players are undocked or when a connection is broken. In preferred embodiments, the entertainment system can be deployed within an aircraft as an in-flight entertainment system.

13 Claims, 4 Drawing Sheets

(56) References Cited

U.S. PATENT DOCUMENTS

| | | |
|---|---|---|
| 6,807,148 B1 * | 10/2004 | Eicher .................... 370/217 |
| 6,813,777 B1 | 11/2004 | Weinberger et al. |
| 7,350,011 B2 | 3/2008 | Keely et al. |
| 7,545,822 B2 | 6/2009 | Fukunaga et al. |
| 2005/0235326 A1 | 10/2005 | Vitito |
| 2006/0107295 A1 * | 5/2006 | Margis et al. ............. 725/81 |
| 2006/0143661 A1 | 6/2006 | Funderburk et al. |
| 2006/0293190 A1 * | 12/2006 | Watson et al. ............ 505/126 |
| 2007/0061847 A1 | 3/2007 | Callahan et al. |
| 2007/0213009 A1 | 9/2007 | Higashida et al. |
| 2007/0224841 A1 | 9/2007 | Davis et al. |
| 2008/0089658 A1 | 4/2008 | Grady et al. |
| 2008/0124054 A1 | 5/2008 | Bonar |
| 2008/0127278 A1 | 5/2008 | Bonar |
| 2009/0117846 A1 | 5/2009 | Mavrakakis |
| 2010/0017827 A1 | 1/2010 | Shalam et al. |
| 2010/0162325 A1 | 6/2010 | Bonar |
| 2010/0162326 A1 | 6/2010 | Bonar |
| 2010/0162327 A1 | 6/2010 | Bonar |
| 2011/0167460 A1 | 7/2011 | Tranchina |

FOREIGN PATENT DOCUMENTS

| | | |
|---|---|---|
| GB | 2466445 | 6/2010 |
| GB | 2468107 | 8/2010 |
| WO | 2008066972 | 6/2008 |

* cited by examiner

1

ENTERTAINMENT SYSTEM WITH NETWORK OF DOCKING STATIONS

This application is a continuation of U.S. patent application Ser. No. 12/610,908, filed on Nov. 2, 2009, now issued U.S. Pat. No. 8,484,686, which claims the benefit of priority to U.S. Provisional Application having Ser. No. 61/119,132 filed on Dec. 2, 2008. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is entertainment media systems.

BACKGROUND

Entertainment systems can be designed to deliver content over a network to a media player. However, such networks include a large number of cables and can be cumbersome to maintain.

In some scenarios multiple media servers are networked together to distribute media content. One approach of networking media servers includes U.S. patent application publication 2009/0117846 to Mavrakakis titled "Media Distribution Kiosk with Virtual Connector for Interfacing with Personal Media Device" (May 2009), which describes a media distribution system where media kiosks can form a daisy-chained networked, through which kiosks can access external networks. The kiosks can have a docking station to allow a device to interface with a kiosk to obtain media.

Yet others have put forth effort to improve content delivery networks by connecting media players together. For example, U.S. Pat. No. 7,545,822 to Fukunaga et al. titled "Information Communicating System, Information Communication Method, Information Signal Processing Device and Information Signal Processing Methods, and Storage Medium" (June 2009) discusses daisy-chained devices connected together via IEEE 1394 connections. Additionally, European patent application EP 0 634 865 to Funston titled "Multi-player Video Presentation System" (January 1995) contemplates that video players can be daisy chained together. Unfortunately, these and other similar related art present application-specific solutions, which are unacceptable for a more general purpose entertainment system.

Better networking approaches for more general purpose entertainment systems include networking a media server to one or more distribution hubs, which in turn forward media content to a player. Such approaches are more desirable for vehicular entertainment systems where space, weight, complexity, or other issues can adversely affect system deployment. For example, U.S. Pat. No. 6,748,597 to Frisco et al. titled "Upgradeable Aircraft In-Flight Entertainment System and Associated Upgrading Methods" (June 2009) describes an entertainment system where Seat Electronic Boxes (SEBs) deliver content to passenger video displays located in seatbacks. A single SEB might service 2, 3, or up to 5 seats. U.S. Pat. No. 6,813,777 to Weinberger et al. titled "Transaction Dispatcher for a Passenger Entertainment System, Method and Article of Manufacture" (November 2004) takes a similar tact to that of Frisco, except that content is distributed through area distribution boxes, which appear to be similar to the SEBs of Frisco.

Even the above approaches their draw backs, especially in a vehicular environment. One drawback includes difficultly of maintaining media players. Media players not generally field replaceable or maintainable, which increases the cost of maintenance. Such costs can be decreased by providing field replaceable media players. For example, U.S. patent application publication U.S. 2006/0107295 to Margis et al. titled "Portable Media Device and Method for Presenting Viewing Content During Travel" (May 2009) describes an entertainment system that utilizes a portable media device where content is distributed to the media devices from a media server. Alternatively, international patent application WO 2008/066972 to Perlman et al. titled "User Interface Device and Method of Presenting Viewing Content" (June 2008) discusses entertainment systems similar to Margis. Perlman discloses that user interface devices can include a common docking interface system to allow one device to be engaged with any other mounting system in a vehicle. Interestingly, Perlman utilizes SEB's for distributing content the devices.

Still, known vehicular entertainment systems suffer from many issues, not the least of which is excessive overall weight or complexity of the network. An even better vehicular entertainment system would be lighter, especially when a target environment for the system is an aircraft. Such a system would also benefit from supporting field replaceable media players. One possible method of reducing weight is to eliminate cables as discussed in U.S. patent application publication U.S. 2007/0213009 to Higashida et al. titled "Wireless Transmission System and Method" (September 2009). The reliability of such a wireless network is questionable especially in an environment requiring nearly 100% reliable content delivery.

Weight can be further reduced by eliminating the need for SEBs or other types of intermediary distribution hubs. Furthermore, maintenance costs for a system can be reduced by employing docking stations for the media players. What has yet to be appreciated is that an entertainment system can be constructed by daisy chaining media player docking stations with a media server. Such a configuration lacks an SEB while allowing all media players to retain connectivity with a media server to obtain media content. Each docking station can be equipped with a player bypass so that neighboring players remain part of the network should the docking stations player be removed.

Thus, there is still a need for entertainment systems having reduced weight and ease of maintenance.

SUMMARY OF THE INVENTION

The inventive subject matter provides apparatus, systems and methods in which an entertainment system comprises a media server networked with a plurality of media player docking stations, where the media server and the docking stations form a looped daisy-chain network. One aspect of the inventive subject matter includes a vehicular entertainment system having a media server comprising multiple network ports and a plurality of docking stations also comprising two or more network ports. The media server and docking stations are networked together to form a looped daisy-chain of devices. In preferred embodiments, the docking stations comprise a media player bypass that directs network packets among the docking station's ports, and a media player port. When a media player is docked, it can receive the packets via a docking station's media player port. When the media player is not docked, the media player bypass retains continuity of the looped network by forwarding packets from one station port to another and bypassing the media player port and. The media player bypass can include a physical switch, a relay switch, a networking switch, or other type of bypass capable of routing media content data among ports of a docking station.

The looped daisy-chained network of devices is preferably configured as a packet switched network capable of exchanging data among the devices. In preferred embodiments, a link layer protocol, possibly including Ethernet, can be used to exchange data. One of the ports of the chained devices can also operate as a terminated end of the network with respect to packet routing to ensure that packets are routed properly in the looped daisy-chained network.

In some embodiments the entertainment system can include more than one looped daisy-chain of docking stations. For example, when deployed within an aircraft, a media server can service two, three, or more looped daisy-chain of docking station. Furthermore, one looped daisy-chain of docking stations could comprise 10, 20, 30, 50, 100, or more docking stations. In this instance, and where other upper limits are not expressly stated, the reader should infer a reasonable upper limit. In this instance, for example, a commercially reasonable upper limit is about 300.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

Various objects, features, aspects and advantages of the inventive subject matter will become more apparent from the following detailed description of preferred embodiments, along with the accompanying drawing figures in which like numerals represent like components.

DETAILED DESCRIPTION

The following description discusses an entertainment system within the context of a vehicular entertainment system, particularly within the context of an aircraft in-flight entertainment system. One should note that of the inventive subject matter is considered to include application of various aspects of the disclosed techniques for other types of entertainment systems or other similar networks. For example, the disclosed techniques could also be applied to a home entertainment system deployed within a house, or a public address system in a building.

Figure 1A:
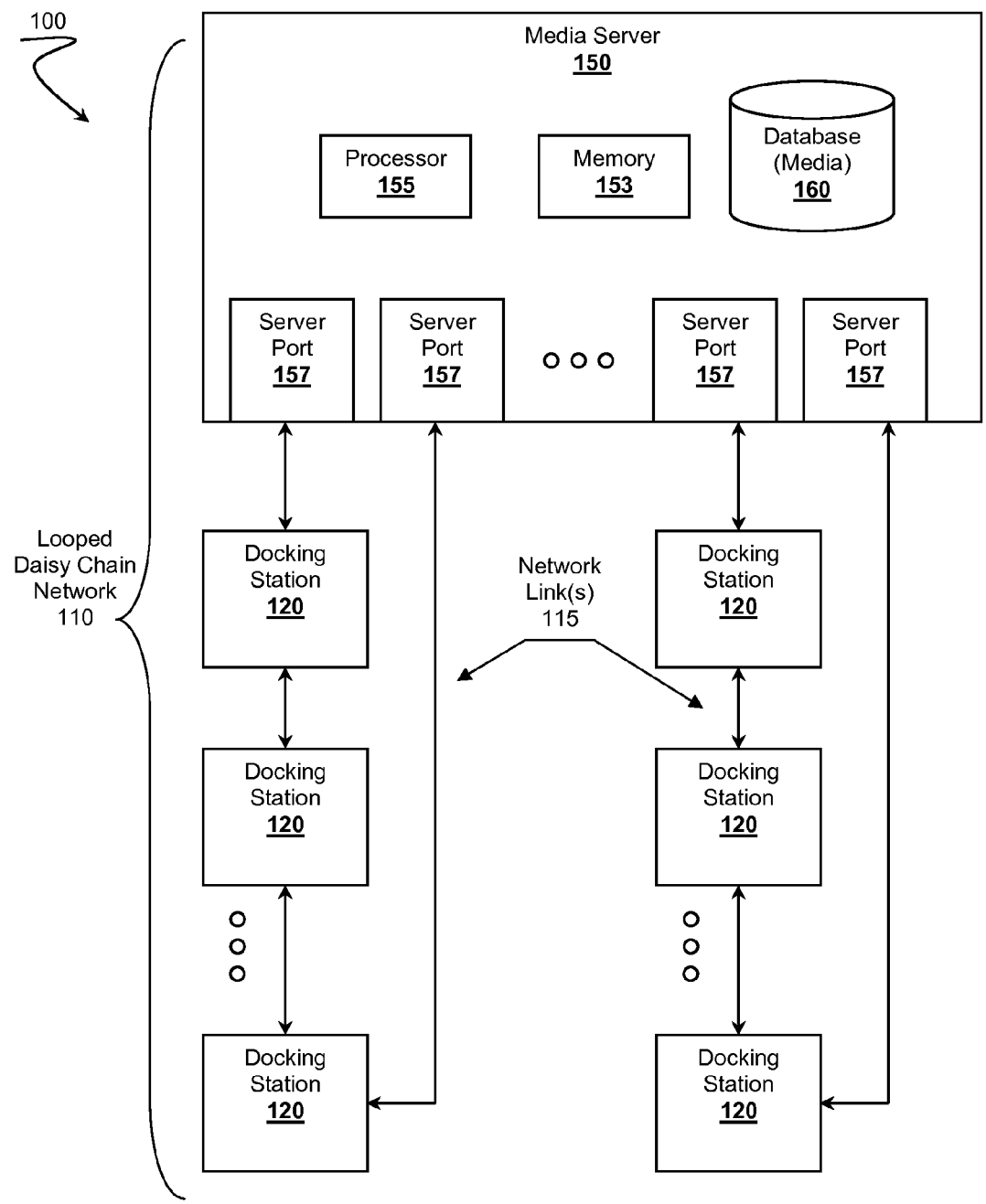
FIG. 1A is a block diagram of a possible entertainment system having a looped daisy-chain network of docking stations connected to a media server.

In FIG. 1A, entertainment system 100 preferably comprises at least one media server 150 communicatively coupled to a plurality of docking stations 120. Media server 150 and docking stations 120 can form looped daisy-chained network 110. Although FIG. 1A illustrates two looped daisy-chained networks 110, one should note that any number of looped daisy-chained networks 110 can be implemented subject to the configuration of media server 150.

Media server 150 preferably comprises a computer device having processor 155, memory 153, and a plurality of server ports 157. Memory 153 represents a computer readable medium storing software instructions configured to fulfill the roles, responsibilities, or functionality of the media server 150. Processor 155 is configured to execute the software instructions. One skilled in the art will appreciate that media server 150 can also comprise other components as is well known in the art to support its functionality including a display, a user interface, a power supply, peripherals, connector ports, or other common components.

Media server 150 preferably has access to media database 160 storing media content on a computer readable media. Media database 160 could comprise magnetic media (e.g., tape, hard drive, race track memory, etc.) or non-magnetic media. Example non-magnetic media can include solid state media (e.g., solid state disks, memory sticks, SD cards, RAM, Flash, ROM, etc.) or non-solid state media (e.g., DVD, Blu-Ray, CDs, etc.). A preferred media for database media 160 includes high capacity Secure Digital Cards preferably having capacities of at least 32GB, 64GB, 128GB, 256GB, 512GB, 1TB, or 2TB. Content can be stored based on a database schema, file system (e.g., FAT, FAT32, NTFS, ext2, ext3, ReiserFS, exFAT, HFS, ZFS, etc.), or other data organizational schemes that can be read by media server 150.

In some embodiments, content is stored in a secure fashion where the content data is encrypted or otherwise locked based a key, possibly a secret key. It is contemplated that only authorized media players could gain access to the content, possibly based on a unique or secret key assigned to the media player. Such approaches are advantageously employed in environments where content providers wish to retain control over licensing or distribution of their content via Digital Rights Management (DRM) schemes.

Media server 150 is depicted as a single computer. It is also contemplated that media server 150 could comprises multiple computing devices working in cooperation. For example, media server 150 could include multiple blade servers. Additionally, media database 160 could be located on or in another computing device in communication with media server 150.

Server ports 157 preferably represent physical network ports capable of sending or receiving data over network links 115. Server ports 157 operate preferably in pairs where two of server ports 157 are connected to the same looped daisy-chained network 110. Server ports 157 can be wired ports or wireless ports. Contemplated wireless ports can include those supporting wireless data exchanges including 802.11, 802.16, wireless USB, Bluetooth, UWB, or other wireless protocols. A preferred wireless port would support 802.11 or its variants. A more preferred server port 157 supports a wired connection (e.g., Ethernet, optic fiber, IEEE 1394, USB, etc.). In a most preferred embodiment, server ports 157 are wired connections supporting Ethernet where network links 115 represent Ethernet links.

Server ports 157 are preferably paired as shown on a network-by-network basis. In a preferred embodiment, server ports 157 are fungible with respect to packet flow through the network. Each of server ports 157 can be an ingress port as well as an egress port with respect to data flow over looped daisy-chained network 110. Ensuring that server ports 157 are fungible with respect to their respective looped daisy-chained network 110 provides for resiliency or robustness of the network should one of network links 115 break. Server ports 157 provide redundant ports through which media server 150 can access other nodes on looped daisy-chained network 110.

At least one of the paired server ports 157 can also be logically terminated with respect to data or packet routing to reduce risks of broadcast storms, infinite loop routing, or other undesirable network behavior. Routing of packets within looped daisy-chained network 110 is preferably based on suitable routing algorithms or protocols that enforce proper routing of data through the loop. Contemplated algorithms or protocols includes variants of spanning tree protocol, mesh networking protocols (e.g., pro-active algorithms: DFR, DSDV, OLSR, TBRPF, etc.; reactive algorithms: DSR, CHAMP, etc.; flow-oriented routing: LUNAR, MPRDV, etc.; adaptive routing: TORA, etc.; hybrid schemes, or others), or other protocols or algorithms. For example, in embodiments that employ spanning tree protocol, one of server ports 157 can be disabled with respect to packet routing.

One should note in a preferred embodiment one of server ports 157 connected to looped daisy-chained network 110 can be disabled or otherwise logically terminated with respect to routing. It is also contemplated that other ports within looped daisy-chained network 110 could also be logically terminated to ensure proper routing. For example, a station port located on one of docking stations 120 could also be logically terminated to prevent undesirable network behavior.

Media server 150 and docking stations 120 communicate over network links 115. Network links 115 are preferably a homogenous set of communication media, and are preferably wired Ethernet networks. It is also contemplated that network links 115 could include wireless links as discussed above in regards to server ports 157. It is also contemplated that network links 115 could include a heterogeneous mix of links, possibly including wired and wireless links. Naturally, server ports 157 and station ports in docking stations 120 are configured to support communicating over network links 115.

Collectively, docking stations 120 and at least one media server 150 form looped daisy-chained network 110. Looped daisy-chained network 110 preferably includes the following characteristics: the network comprises a communication loop, each node is connected to a next node via network link 115, and each node can route data from a source to a destination through itself. In a preferred embodiment, looped daisy-chained network 110 comprises a packet switched network operating on a wired Ethernet link layer.

It is also contemplated that looped daisy-chained network 110 could include a wireless network, possibly a mesh network or ad-hoc mesh network, where docking stations 120 connect to each other via wireless network links 115. It is thought that such an approach would further reduce weight in a vehicular entertainment system be reducing cabling. It is also thought that additional algorithms, heuristics, or protocols could be necessary to ensure that data exchanges are robust over a wireless network that might otherwise drop packets when exchanging data based on less robust protocols (e.g., UDP, TFTP, etc).

FIG. 1A illustrates that entertainment system 100 could include one, two, or more of looped daisy-chained network 110. In a preferred embodiment deployed on an aircraft, entertainment system 100 includes three of looped daisy-chained network 110 from a single media server having at least six of server ports 157. One should appreciate that additional media servers 150 could be introduced to increase the number of looped daisy-chained network 110 or media server 150 could include more server ports 157 to increase the number looped daisy-chained network 110 connected to media server 150.

Media server 150 has multiple roles or responsibilities with respect to looped daisy-chained network 110. One role includes disseminating media content to media players docked within docking stations 120. Media content can include audio data, video data, movies, games, public service information, vehicular information, menus, user interfaces, or other content. In some embodiments, media server 150 uploads all media content to the docked media players. Another role includes routing data through media server 150 as necessary through media server 150 as occurs with other nodes in looped daisy-chained network 110. Further roles or responsibilities of media server 150 can include managing docking stations 120, providing firmware updates to media players or docking stations 120, downloading passenger information (e.g., IFE usage metrics, purchases, etc.) from docked media players, authorizing access to DRM media content, authenticating users with respect to entertainment system 100, or other functionality.

One should note that media server 150 can be considered a central hub for multiple looped daisy-chained network 110. More specifically, media server 150 can be a member of one or more of looped daisy-chained network 110, and can provide content or other management function services to each looped daisy-chained network 110.

The number of docking stations 120 in looped daisy-chained network 110 can vary widely depending on a target application. In an automotive environment, looped daisy-chained network 110 might only have two or three of docking stations 120. In a home environment, looped daisy-chained network 110 might have two, three, four, five, or as many as 10 docking stations 120. In larger environments, an office building for example, one could expect dozens of docking stations 120 in looped daisy-chained network 110. In a preferred aircraft environment, one could reasonably expect to have at least 10, 20, 30, 40, 50 or more docking stations 120 in looped daisy-chained network 110. In large airliners, entertainment system 100 can have over 100 docking stations 120 in looped daisy-chained network 110.

Figure 1B:
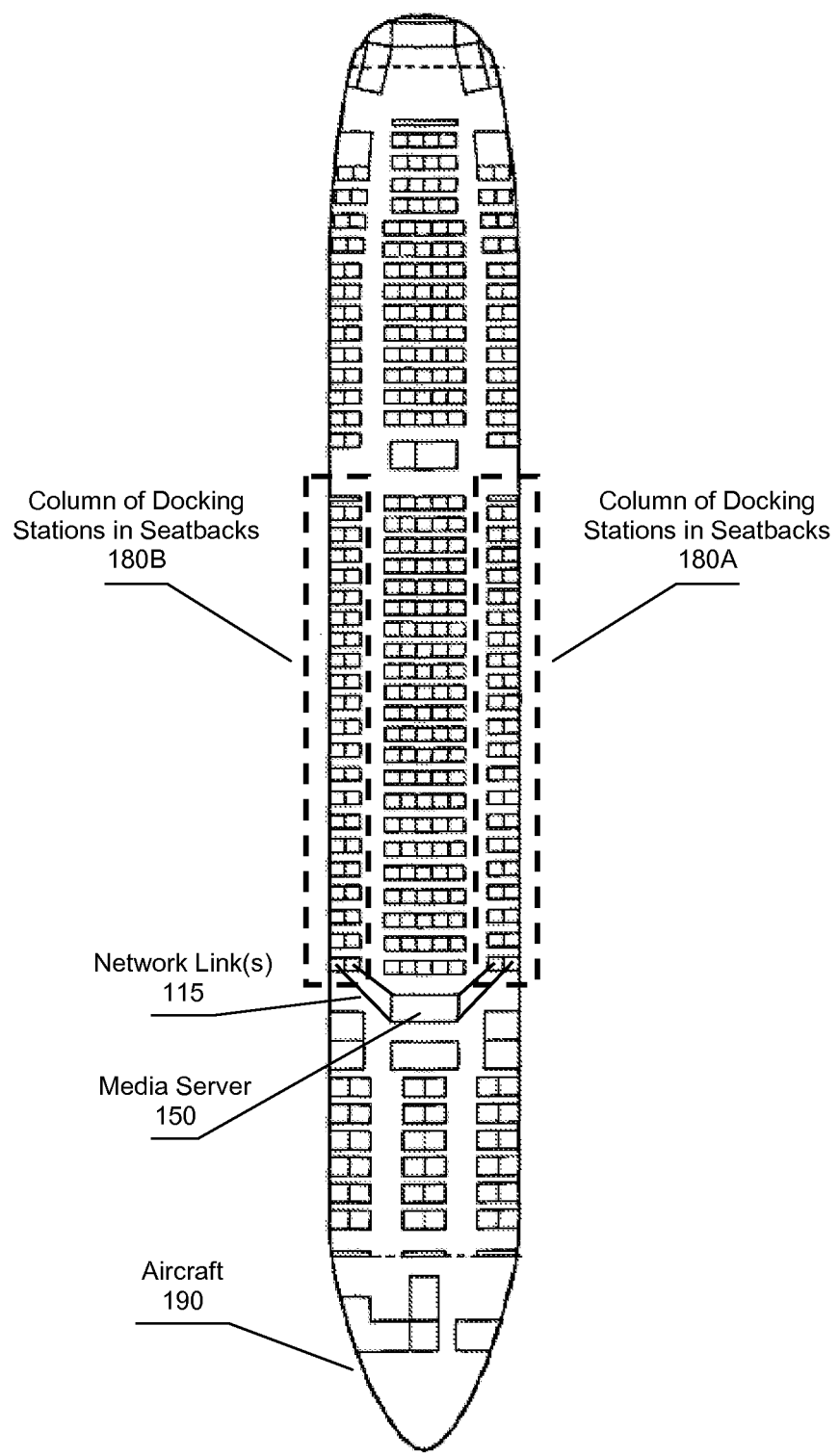
FIG. 1B is a diagram of a possible aircraft having an entertainment system where multiple looped daisy-chain networks of docking stations are arranged in columns.

Although docking stations 120 from looped daisy-chained network 110 with media server 150, the physical arrangement of docking stations 120 can widely vary depending on the physical environment where entertainment system 100 is deployed. FIG. 1B illustrates a possible arrangement of docking stations 120 deployed within aircraft 190, where looped daisy-chained network 110 is deployed in columns 180A or 180B. For each column 180A or 180B of looped daisy-chained network 110, docking stations 120 can be disposed within seatbacks of aircraft 190. The network links 115 of looped daisy-chained network 110 can run up along the window column of seats and return back along the aisle column of seats to media server 150. Docking stations 120 could also be positioned within bulkheads, ceilings, walls, arm rests, or other locations besides seatbacks. Additional columns (not shown) can be added to address center seats as desired.

It is also contemplated that looped daisy-chained network 110 can be deployed on a compartment-by-compartment basis. For example, a first class compartment could have a looped daisy-chained network 110 configured to support higher data rates, possibly based on a wired network, while a business class or economy class could have slower data rates based on a wireless version of a looped daisy-chained network 110. In such embodiments, looped daisy-chained network 110 can be configured to offer different quality of service based on compartment, location, paid fees, or other parameters associated with the environment.

Advantages of providing looped daisy-chained network 110 comprising media server 150 and docking stations 120 should be readily apparent. Should a single break in looped daisy-chained network 110 occur, media server 150 can still deliver content to docked media players, even though the loop is broken. Additionally, given that looped daisy-chained network 110 is formed from docking stations 120, if a media player is not docked for what ever reason, continuity of looped daisy-chained network 110 is retained and data flow is not disrupted. Such an approach is considered superior to that of networking SEBs because looped daisy-chained network 110 provides for fault isolation. For example, should an SEB file, an entire row of seats would loose access to media content. In the contemplated environments having looped daisy-chained network 110, if a docking station 120 or media player fail, only a single seat might loose access to content. Furthermore, if the media player fails, it can be replaced with another media player quickly by an authorized individual.

Figure 2:
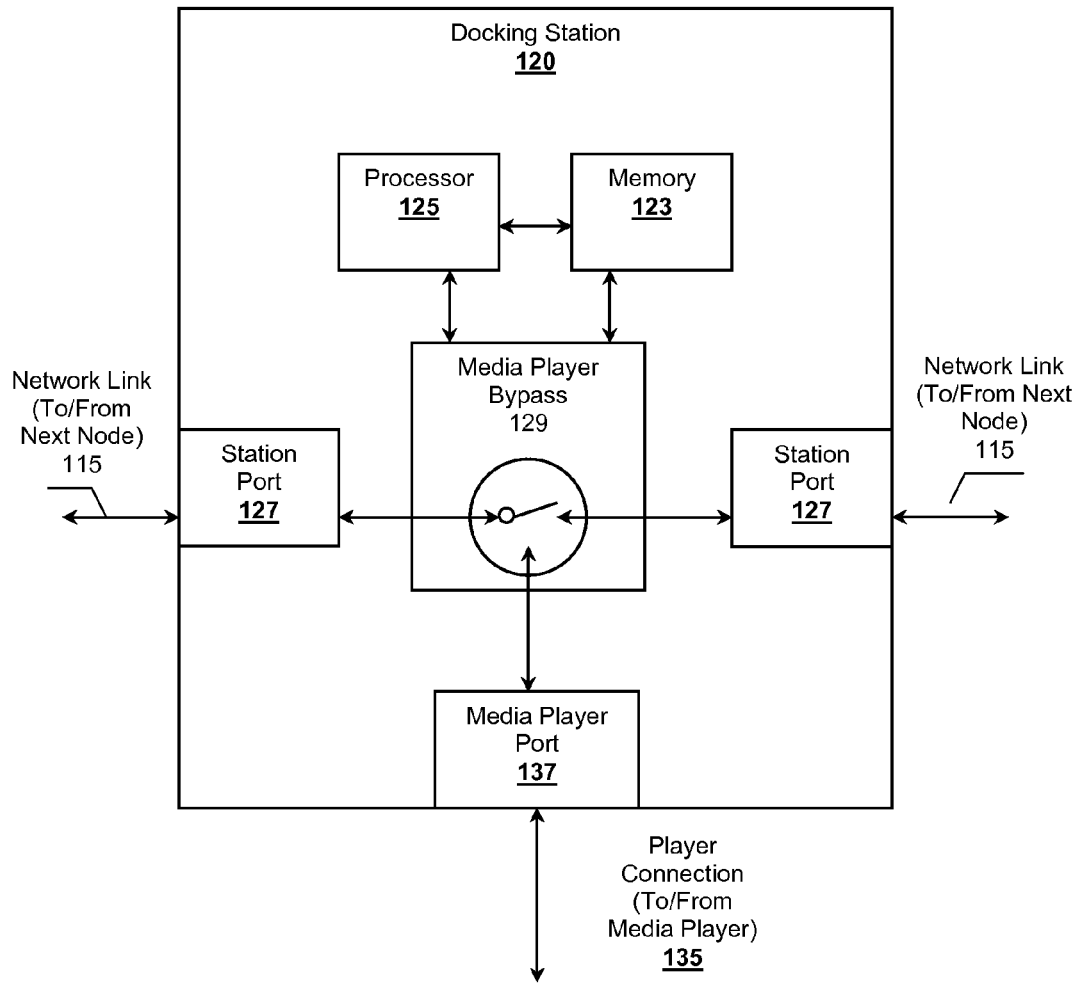
FIG. 2 is a block diagram of a possible docking station from FIG. 1 having a media player bypass.

FIG. 2 presents a more detailed view of a possible docking station 120. Preferred docking stations 120 comprise at least two station ports 127, media player port 137, and media player bypass 129. It is also contemplated that docking station 120 can include processor 125 and memory 123. One should also appreciate that docking station 120 can include other components to support its operation, possibly including a power supply, a player locking mechanism, a housing, or other components.

Preferably docking station 120 comprises two station ports 127 to provide for a daisy-chained connection to a next node in the chain: another docking station 120 or media server 150. It is also contemplated that docking station 120 could include three or more of station port 127 to support additional connections to other devices, networks, or even another looped daisy-chained network 110. A preferred station port 127 supports a wired connection (e.g., Ethernet, optic fiber, IEEE 1394, USB, etc.). In a most preferred embodiment, station port 127 support wired connections providing for Ethernet communications where network links 115 represent Ethernet links. For example, station port 127 could be an RJ-45 connector.

Although a preferred embodiment comprises a wired looped daisy-chained network 110, where docking stations 120 connect with each other over wired station ports 127, it is also contemplated station ports 127 could be wireless. In such an embodiment, docking stations 120 could form a wireless mesh network where docking stations 120 that are close to media server 150 operate as an intermediary relay node providing connectivity to docking stations 120 further from media server 150. In such an approach, docking station 120 can form a wireless looped daisy-chained network 110.

Contemplated wireless ports can include those supporting wireless data exchanges including 802.11, 802.16, wireless USB, Bluetooth, UWB, or other wireless protocols. A preferred wireless port would support 802.11 or its variants.

Docking station 120 preferably includes media player port 137 configured to connect to a media player via a player connection 135. In a preferred embodiment, media player port 137 physically mates with a corresponding connecter on a docked media player in a cable-less manner. In some embodiments, media player port 137 can be configured to float freely within a constrained region to allow some freedom of movement due to vehicular vibration. Such an approach reduces stresses on the docked media player connection.

Media player port 137 preferably comprises one or more multi-lead connector configured to interface to a docked media player. In a preferred embodiment, media player port 137 can provide a media player network access to looped daisy-chained network 110, power, or other services. Although a single media player port 137 is shown in FIG. 2, it is also contemplated that additional ports could be provided as desired. For example, a heterogeneous mix of media player ports 137 might be disposed with docking station 120 to support a heterogeneous mix of media players.

Media player bypass 129 provides continuity for looped daisy-chained network 110 when a media player is or is not docked with docking station 120. When a media player is docked in docking station 120, media player bypass 129 can send data signals to the docked media player through media player port 137. When the media player is not docked in docking station 120, media player bypass 129 allows data signals to bypass media player port 137 and to pass from one of station ports 127 to another.

Media player bypass 129 can be realized via different configurations, most preferably operating as a switch. In some embodiments, media player bypass can operate as a signal switch, which causes data signals to bypass media player port 137 when a media player is not present, and to cause the data signals be passed to media player port 137 when the media player is present in docking station 120. Signal switch could comprise a relay switch (e.g., an electrical switch), a mechanic switch, or other physical switch. For example, docking station 120 could include an actuator that physically toggles signal lines from station port 127 to route signals to media player port 137 when the media player is physically inserted to or otherwise docked with docking station 120.

In a more preferred embodiment, media player bypass 129 comprises a packet switch configured to route packets from looped daisy-chained network 110 among station ports 127 and media player port 137. In such an approach, media player bypass 129 can operate in a similar manner as known network switches. As packets enter docking station 120 from any of is ports, the switch determines how to route the packets toward its destination. One should appreciate, that media player bypass 129 can function as a layer 2 switch (e.g., link layer), a layer 3 switch (e.g., network layer router), or even a layer 4 switch (e.g., transport layer) with respect to packet processing. It is also contemplated that media player bypass 129 could incorporate a combination of different types of switches operating in cooperation.

Docking station 120 can have various degrees of intelligence with respect to a docked media player, media distribution, networking, or other functionality. In some embodiments, docking station 120 is merely a dumb device, minimally having only station ports 127, media player port 137, or media player bypass 129. In other embodiments, docking station 120 can include one or more of processor 125 and memory 123, through which docking station 120 can provided additional functionality.

Memory 123 can store data in addition to programmatic software instruction that can be executed on processor 125 to provide desired functionality. For example, memory 123 could store information relating to docking station 120 possibly comprising an identifier, firmware, public keys, private keys, status information (e.g., media player present, not present), passenger seat identifiers, or other information. Additionally, memory 123 could comprise one or more buffers to temporarily store portions of media content when delivering content to a docked media player or other members of looped daisy-chained network 110.

Preferred docking stations 120 are configured as a receptacle for a media player and lack ability to play content media. It is also contemplated that memory 123 can be configure in a manner where memory 123 is unable store a complete media file to ensure that media content remains restricted or under proper DRM. In other embodiments, docking station 120 could have sufficient memory 123 (e.g., HDD, SSD, SD card, etc.) to store media content, possibly secured by encrypting the data through a secret key, which is then delivered to a docked media player. Such an approach is less preferred than an approach where media server 150 or the media player storing content.

In a preferred embodiment, docking station 120 can be deployed within a seatback of a vehicle. It is also contemplated that docking station 120 can be deployed within a bulk head, a ceiling, a floor panel, a wall panel, or other locations about an environment.

An acceptable docking station that could be adapted for use within the existing subject matter is described in co-pending patent application having Ser. No. 12/467,959 titled to Bird et al. "Universal Docking System" filed on May 18, 2009.

Figure 3:
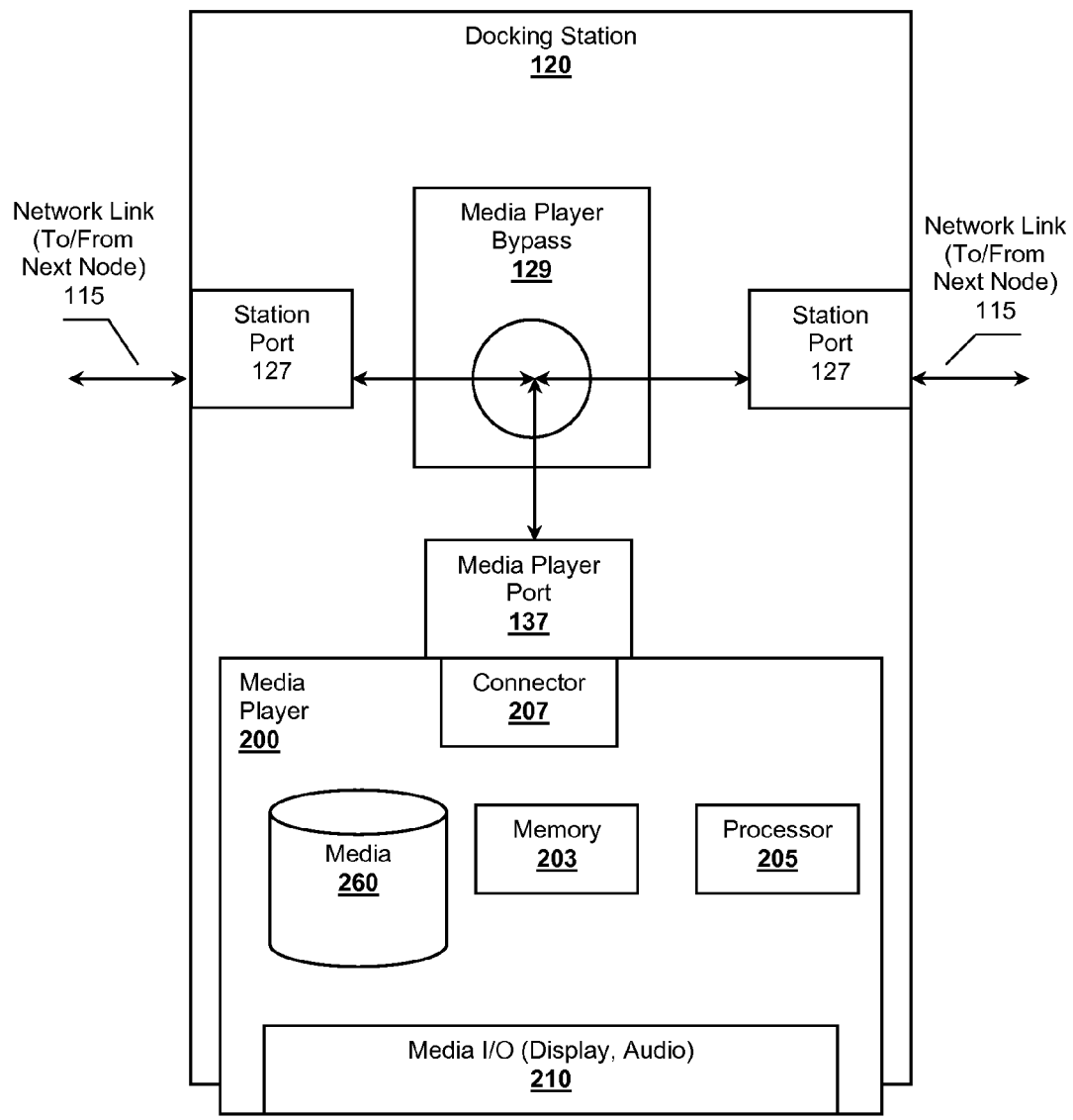
FIG. 3 is a block diagram of the docking station from FIG. 2 having a docked media player.

FIG. 3 illustrates docking station 120 having a docked media player 200. Player 200 preferably directly connects to docking station 120 where one or more of connector 207 mates with one or more of corresponding media player ports 137. The mated connection is preferably a cable-less connection.

In a preferred vehicular entertainment system, media player 200 can be configured for multiple purposes. For example, media player 200 can be configured to provide audio-video media content to a passenger, public service information, vehicular information, game content, web content, or other data. It is also contemplated that media player 200 can be configured to upload data to media server 150 via looped daisy-chained network 110. For example media player 200 could send passenger IFE usage information, shopping data, survey data, or other collected information to media server 150. Content can be presented via media I/O 210 (e.g., display, speakers, etc.). It is also contemplated that media player 200 can include one or more user interfaces or controls (not shown) to allow a user to interface with the content or other aspects of the entertainment system. For example, media player 200 could include a detachable game controller, a touch sensitive screen, volume buttons, channel selects, or other controls.

Media player 200 preferably comprises computer readable media 260 configured to store media content locally, possibly obtained from a media server. In some embodiments, media 260 can include removable media. For example, removable media can include a disk drive, CD, DVD, Blu-Ray, flash memory, or other types of computer readable media. In a preferred embodiment, media 260 includes an SD card having a capacity of at least 32 GB, 64 GB, 128 GB, 256 GB, 512 GB, 1 TB, or at least 2TB. Removable media provides for quickly updating media player 200 with new content without requiring a long download time by allowing an individual to replace a media 260 storing stale content with a media 260 storing new content. In more preferred embodiments, media server 150 updloads content to media 260 of multiple docked media player 200, especially in an aircraft IFE.

Media player 200 can also include processor 205 and memory 203. Memory 203, possibly also functioning as media 260, can stored software instruction governing the operations, roles, responsibilities, or other functionality of media player 200 when executed by processor 205.

Memory 203 can store additional data relating media player 200. Additional data or information can include public keys, private keys, DRM information, content licensing information, player identifier, or other information related to media player 200. The information can exchanged with media server 150 to authenticate or to authorize media player 200 with respect to playing content.

Media player 200 can also be configured to play media content under direction of media server 150. In some embodiments, media server 150 can stream content to media player 200. In more preferred embodiments, media server 150 authorizes media player 200 to play the media content stored locally, possibly based on identification information (e.g., ID, GUID, UUID, private keys, licensing information, etc.) supplied by media player 200.

In a preferred embodiment, docking station 120 can include a packet switch that operates as media player bypass 129. It is also contemplated that a packet switch could be disposed within media player 200. In such an embodiment, when media player 200 is docked with docking station 120, all looped daisy-chained network 110 traffic passing through docking station 120 would be routed to media player 200. The packet switch within media player 200 can then determine how to forward the packets on toward their destination, if the destination is another node other than media player 200.

An astute reader will recognizing the similarity of the combined media player 200 and docking station 120 assembly to that of media server 150. It is specifically contemplated that media server 150 could comprises at least one media player 200 docked in its corresponding docking station 120.

Preferred media players 200 represent embeddable media players 200 capable of being locked into a docked position within docking station 120. Preferably, media player 200 remains locked in a docked position until unlocked via an appropriate key. The key could be magnetic, electric, mechanical, or other type of key. Such an approach ensures only an authorized individual is able to remove media player 200 from a docked position.

As previously discussed, the inventive subject matter can be advantageously applied to other types of networks. For example, it is contemplated that looped daisy-chained networks can be employed in an arcade environment, home entertainment environment, or other entertainment systems. A preferred media player comprises A/V support. Additionally, a media player could also comprise a cell phone, music player, recording device, or other portable devices configured to play media.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:
1. A vehicular entertainment system, comprising:
a media server storing media content in a media database on computer readable media and having a first server port and a second server port;
a plurality of docking stations coupled to the media server, each of the docking stations having at least a first station port, a media player port, and a second station port, and each docking station configured to allow insertion of a media player into the docking station such that the media player port of the docking station couples with a connector of the media player when the media player is at least partially inserted into the docking station, wherein the media players comprises a display;

wherein at least some of the docking stations comprise a media player bypass configured to direct network data between a docking station's first station port and second station port when a media player is undocked, and wherein the media player bypass is configured to route network data among the media player port and at least one of the first and second station ports of the docking station when a media player is docked; and wherein the media server and plurality of docking stations are disposed within an aircraft, and wherein the plurality of docking stations comprises at least ten docking stations.

2. The system of claim 1, wherein each of the plurality of media players is configured to store at least some content locally.

3. The system of claim 1, wherein the media server and plurality of docking stations comprises a packet-switched network.

4. The system of claim 3, wherein the media server is configured to communicate with docked ones of the plurality of media players using a link layer protocol.

5. The system of claim 1, wherein the media server comprises additional server ports coupled to a plurality of different networks of docking stations.

6. The system of claim 1, wherein the media server comprises at least one of the plurality of media players that is docked in its corresponding docking station.

7. The system of claim 1, wherein at least some of the docking stations are disposed in seatbacks within the aircraft.

8. A vehicular entertainment system, comprising:
a media server configured to store media content and having first and second server ports;
a first set of docking stations communicatively coupled to the first server port, and a second set of docking stations communicatively coupled to the second server port;
wherein each of the docking stations of the first and second sets have first and second stations ports, wherein the docking stations are each configured to allow a removable media player having a display to dock with the docking station, wherein the docking stations further include a media player port that couples with a connector of the media player when the media player is at least partially inserted into the docking station, and wherein at least some of the docking stations comprise a media player bypass configured to direct network data between a docking station's first station port and second station port when the removable media player is undocked, and wherein the media player bypass is configured to route network data among the media player port and at least one of the first and second station ports of the docking station when a media player is docked;

wherein each of the docking stations of the first set are coupled to form a first chain, and wherein each of the docking stations of the second set are coupled to form a second chain; and wherein the media server and docking stations are disposed within an aircraft, and wherein the first and second sets collectively comprise at least ten docking stations.

9. The system of claim 8, wherein each of the plurality of media players is configured to store at least some content locally.

10. The system of claim 8, wherein the media server and plurality of docking stations comprises a packet-switched network.

11. The system of claim 10, wherein the media server is configured to communicate with docked ones of the plurality of media players using a link layer protocol.

12. The system of claim 8, wherein the media server comprises additional server ports coupled to a plurality of different networks of docking stations.

13. The system of claim 8, wherein the media server comprises at least one of the plurality of media players that is docked in its corresponding docking station.

* * * * *